United States Patent
Drees

(10) Patent No.: US 11,815,005 B2
(45) Date of Patent: Nov. 14, 2023

(54) PASSIVE PRECHAMBER SPARK PLUG

(71) Applicant: Bayerische Motoren Werke Aktiengesellschaft, Munich (DE)

(72) Inventor: Rainer Drees, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/798,827

(22) PCT Filed: Jan. 14, 2021

(86) PCT No.: PCT/EP2021/050613
§ 371 (c)(1),
(2) Date: Aug. 10, 2022

(87) PCT Pub. No.: WO2021/160363
PCT Pub. Date: Aug. 19, 2021

(65) Prior Publication Data
US 2023/0082577 A1  Mar. 16, 2023

(30) Foreign Application Priority Data
Feb. 11, 2020 (DE) ...................... 10 2020 103 460.1

(51) Int. Cl.
*F02B 19/16* (2006.01)
*H01T 13/52* (2006.01)
(Continued)

(52) U.S. Cl.
CPC ............ *F02B 19/12* (2013.01); *F02B 19/165* (2013.01); *H01T 13/462* (2013.01); *H01T 13/52* (2013.01); *H01T 13/54* (2013.01); *H01T 13/22* (2013.01)

(58) Field of Classification Search
CPC ...... F02B 19/12; F02B 19/165; H01T 13/462; H01T 13/52; H01T 13/54; H01T 13/22
(Continued)

(56) References Cited

U.S. PATENT DOCUMENTS 4,924,829 A   5/1990  Cheng et al.
2022/0003176 A1 * 1/2022  Leone .................. F02P 5/1502

FOREIGN PATENT DOCUMENTS

CN    207218004 U  *  4/2018
DE    33 05 153 C2    8/1984
(Continued)

OTHER PUBLICATIONS

PCT/EP2021/050613, International Search Report dated Apr. 12, 2021 (Two (2) pages).
(Continued)

*Primary Examiner* — Mahmoud Gimie
(74) *Attorney, Agent, or Firm* — Crowell & Moring LLP

(57) ABSTRACT

A passive prechamber spark plug for use in a combustion chamber of a vehicle engine includes an upper prechamber having an upper opening where the upper prechamber is connectable to the combustion chamber via the upper opening. An air ignition spark is formable via an upper air spark gap. A central electrode is disposed in an upper region of the upper prechamber where a base of the upper prechamber opposite the upper region is an insulator. An electrically conductive element or a slot is guided by the insulator continuously from the upper prechamber into a lower region under the base and the lower region is either a lower prechamber or is arrangeable directly in the combustion chamber. An earth electrode is disposed in the lower region such that a lower air-surface gap spark gap is formed between the earth electrode and the electrically conductive element or the slot.

8 Claims, 5 Drawing Sheets

(51) Int. Cl.
  *H01T 13/22* (2006.01)
  *F02B 19/12* (2006.01)
  *H01T 13/46* (2006.01)
  *H01T 13/54* (2006.01)

(58) Field of Classification Search
  USPC .......................................................... 123/259
  See application file for complete search history.

(56) References Cited

FOREIGN PATENT DOCUMENTS

| | | |
|---|---|---|
| DE | 690 02 720 T2 | 11/1993 |
| DE | 10 2017 011 209 B3 | 1/2019 |
| DE | 10 2017 221 517 A1 | 6/2019 |
| DE | 10 2017 222 084 A1 | 6/2019 |
| EP | 0 669 454 A1 | 8/1995 |
| EP | 3 453 856 A1 | 3/2019 |
| WO | WO 2018/104681 A1 | 6/2018 |

OTHER PUBLICATIONS

German-language German Office Action issued in German application No. 10 2020 103 460.1 dated Oct. 9, 2020 (Five (5) pages).
U.S. Patent Application, "Passive Prechamber Spark Plug", filed Aug. 10, 2022, Inventor Rainer Drees.

\* cited by examiner

PASSIVE PRECHAMBER SPARK PLUG

BACKGROUND AND SUMMARY OF THE INVENTION

The invention relates to a passive prechamber spark plug.

Spark plugs are known. They are used to ignite the combustion chamber of an Otto engine by producing ignition sparks which ignite the gas admixture in the combustion chamber.

In a normal spark plug, a spark discharge is produced at the ignition time between the central electrode and the earth electrode and is caused by the ignition coil by the coil making the corresponding ignition voltage requirement available. From the location at which the ignition spark is produced and which is dependent on the installation location and position of the spark gap, the flammable gas admixture which is provided in the compressed cylinder is thereby ignited, more specifically the fuel/air admixture. The flame front then expands at a corresponding speed in the direction of the cylinder wall. In the Otto engine, it is desirable to implement a time which is as early as possible for reasons of efficiency. When the ideal ignition time is depends on a large number of factors.

The problem with normal ignition is the flame front which is generated, more specifically the speed at which the admixture which is ignited by means of the spark plug in the combustion chamber propagates. Ideally, this operation should be carried out as quickly as possible and in a controlled manner.

In order to achieve a rapid propagation of the flame front and an earlier ignition time which can thereby be implemented, there are several possible methods. There could be provided an additional spark plug in the combustion chamber in order to start the ignition at different positions in the cylinder at the same time. In this case, however, a very large amount of construction space is required in the cylinder for the additional spark plugs. Furthermore, each spark plug requires an individual ignition coil.

Alternatively, the prechamber ignition principle can be used as the ignition method. Prechamber spark plugs are already known. However, they have been used until now mainly in large-volume industrial engines, in particular in very large gas engines. In the automotive sector, prechamber spark plugs are currently used only partially in motor racing because they involve disadvantages which have not yet been overcome. In principle, a prechamber ignition system is constructed in such a manner that a spark plug present is provided with a cap, in which there are holes. Prechamber systems are subdivided into active and passive systems. Prechamber spark plugs for use in the vehicle sector are theoretically already known, for example, from DE102017221517A1, DE102017011209B3 or DE102017222084A1.

The main problem for the use of passive prechamber spark plugs in the automotive sector is the operating range in which it reliably operates. It has the greatest usable advantage at high speeds and loads, for which reason prechamber spark plug systems have also been used only in the motor racing sector until now. A prechamber spark plug comprises a prechamber volume which is formed by the cap and the necessary outlet openings which direct away the ignition which is produced in the prechamber laterally at a corresponding discharge pressure in the combustion chamber, ideally simultaneously and efficiently in many areas and particularly into the external combustion chamber regions. In this case, the combustion chamber should be ignited as quickly as possible, that is to say, without any delayed combustion, as known from normal ignition systems. Only then can the ignition time be configured in an optimum manner.

In order to ensure this, it would be possible to construct or configure a prechamber by ideally implementing the prechamber volume, number, cross sections, position and form of the outlet nozzles. For the following reasons, however, this has been found to be very difficult until now over the entire speed, load, temperature range. If the prechamber spark plug is configured for the upper speed or load range, in which it affords the most advantages, problems may occur in the lower speed or load range, in particular at low temperatures or in the start operation, because then it does not always reliably ignite. If it is mainly configured for a lower speed range or load range, in the upper speed range the full potential can no longer be utilized. In order to solve this problem, there are already considerations to implement a second smaller, normal air-spark spark plug in the region of the inlet valves which is intended to ensure reliable ignition in the lower part-load range, see patent application EP3453856A1. However, this would mean that, in addition to a prechamber spark plug which is already more complex and which has an ignition coil, a second, normal spark plug with an additional second ignition coil per cylinder also has to be implemented. The costs, the complexity for the constructional implementation and the control complexity thereby increase to an extreme degree.

In order not to have to adapt the entire structural concept of the cylinder head in a current internal combustion engine and in order not to have to reserve additional structural space, therefore, it is necessary to find a solution in order to provide a passive prechamber spark plug which is less complex structurally and with respect to operation and by which a reliable ignition of the fuel/air admixture can be brought about in all speed and load ranges and as far as possible in all temperature ranges.

In all these concepts, air-spark spark plugs are used because they are easier to configure and to handle in comparison with air-surface gap spark plugs which are also already known. Nevertheless, air-surface gap spark plugs may involve advantages which have not previously been used.

Therefore, an object of this invention is to provide a corresponding passive prechamber spark plug.

There is provided a passive prechamber spark plug for use in the combustion chamber of a vehicle engine, having an upper prechamber having at least one upper opening, via which the upper prechamber is connected to the combustion chamber, and an upper air spark gap, via which an air ignition spark can be formed. Furthermore, a central electrode is provided in an upper region of the upper prechamber. A base of the upper prechamber opposite this region is in the form of an insulator, wherein an electrically conductive element or a slot is guided by the insulator continuously from the upper prechamber into a lower region under the base, and wherein the lower region is either formed as a second prechamber or arranged directly in the combustion chamber. In this lower region, an earth electrode is provided in such a manner that a lower air-surface gap spark gap, via which an air-surface gap ignition spark can be formed, is formed between the earth electrode and the electrically conductive element or the slot.

As a result of the provided passive prechamber spark plug, in which an air spark and a surface-gap spark are formed within a spark plug, a simple, highly efficient configuration is ensured in the highest speed or load range and at the same time a reliable ignition in the lower speed or load range. To this end, only a single fitted ignition unit and only a single ignition coil are necessary and no additional structural space is further needed.

There is further provision for the lower region to be formed as a lower prechamber, and wherein in the lower prechamber at least one lower opening, via which the lower prechamber is connected to the combustion chamber, is provided. The electrically conductive element and the earth electrode are arranged in such a manner that the two spark gaps are located in series relative to each other.

There is further provision for the lower region to be located directly in the combustion chamber, wherein the electrically conductive element and the earth electrode are arranged in such a manner that the two spark gaps are located in series relative to each other.

There is further provision for the electrically conductive element to be a metal insertion component.

There is further provision for the width of the slot to be substantially smaller than the spacing between the earth electrode and upper openings.

The width of the slot requires only fractions of a millimeter. The opening is negligibly small in relation to the outlet nozzles. The important aspect is that the distance between the electrodes remains as small as possible, that is to say, the distance between the central electrode and the conductive element or slot and the conductive element or slot and the earth electrode.

There is further provision for the insulator to be formed as an insulating ceramic material.

There is further provided a vehicle engine having at least one described passive prechamber spark plug.

Additional features and advantages of the invention will be appreciated from the following description of embodiments of the invention with reference to the Figures which show details according to the invention and from the claims. The individual features can be implemented individually per se or together in any combination in a variant of the invention.

Preferred embodiments of the invention will be explained in greater detail below with reference to the appended drawings.

DETAILED DESCRIPTION OF THE DRAWINGS

Figure 1:
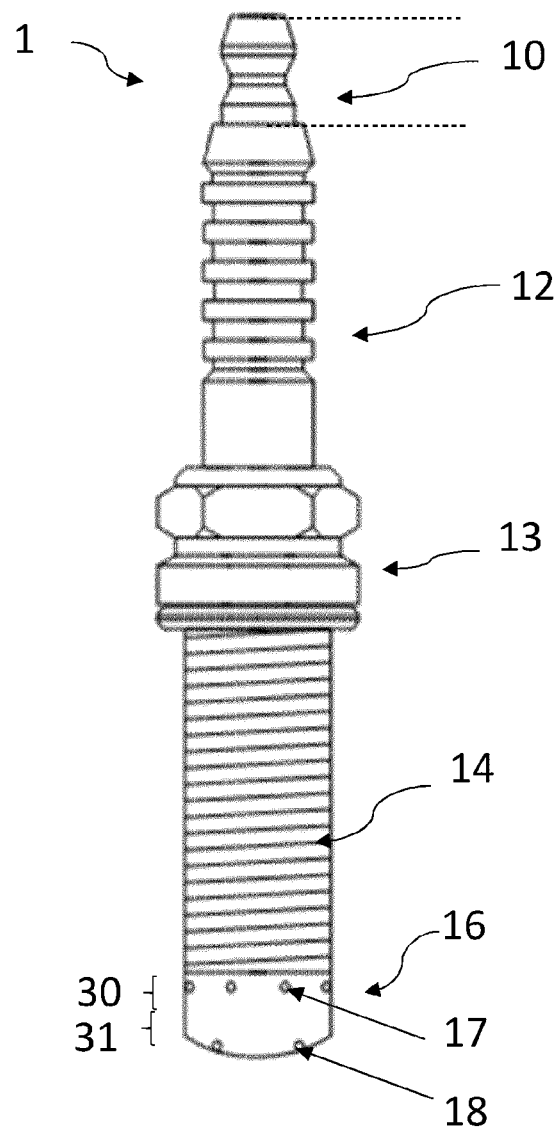
FIG. 1 shows an external view of an embodiment of a prechamber spark plug according to an embodiment of the present invention.

In the following descriptions of the Figures, identical elements or functions are referred to using the same reference numerals.

The basic concept of the invention is to provide a passive prechamber spark plug, by which a reliable ignition of the fuel/air admixture can be brought about in all speed or load ranges and in all temperature ranges to the greatest possible extent without requiring additional structural space.

This is achieved by the provided passive prechamber spark plug, wherein only one single ignition unit is necessary with only one single ignition coil. Consequently, the problem of previously known prechamber spark plugs is solved, that is to say that an optimum configuration was previously possible only either for full load or for partial load or cold starts.

The methodology for providing an ignition sparking in a vehicle in the internal combustion engine is known. A coil having a primary winding with a relatively small number of windings and a secondary winding having a high number of windings is provided. Consequently, a voltage can be highly transformed. The primary side of the coil is coupled at one winding end to the supply voltage. The other winding end is supplied to the earth via an IGBT as an end stage. In order to generate an ignition spark, initially the primary side of the ignition coil must be charged with energy. In order to achieve this, the IGBT must be switched through at a first time so that an electric current can flow through the coil. The coil has an inductivity so that the electric current increases with Lxdi/dt. The charging current does not have a linear progression as a result of the inductivity but it changes to the resistive range or to saturation in accordance with inductive behavior. That is the range which a coil does not withstand for long because it becomes powerfully heated thereby and ultimately even destroyed. Therefore, the ignition time should be shortly before this fixed point. In normal ignition coils, the charging time is up to the ideal ignition time, for example, approximately 3 ms. The adaptation is carried out via performance characteristics in accordance with the current on-board network voltage. This means that, if the on-board network is rather weak in voltage terms, a slightly longer closure time is selected and, if the on-board network has a very high voltage, the closure time is selected to be slightly shorter. In the software application of an ignition, therefore, it must be precisely known when the ignition is intended to be carried out, how long the charging time of an ignition coil is and when the ignition coil has to start being supplied with energy.

At the ideal time, the ignition spark is then produced approximately as follows. If the end stage (IGBT) is no longer controlled, it very rapidly becomes highly resistive. Therefore, the end stage does not allow a current flow any more. The coil behaves as an inductive energy store. It has the requirement of maintaining the current, which is impossible, however, because of the highly resistive end stage. For compensation, it thereby drives the voltage high between the winding ends. Since the ignition coil is constructed as a transformer, this also occurs at the secondary winding, but with the correspondingly high ratio. The voltage at the winding ends of the secondary winding therefore increases many times again at this time. In principle, the secondary winding is connected at each end of the winding to earths. However, there is the interruption as a result of the air gap at the spark plug, the so-called spark gap. This air gap or spark gap is not an obstacle for the current flow, however, if a correspondingly high voltage is applied to the spark plug. At some time, the voltage is sufficient for a plasma channel to be formed and for the current to arc over in the form of a small flash (ignition spark).

Under normal atmospheric conditions, approximately 1 kV per millimeter of air gap is required in order to achieve the arc-over. In a combustion chamber in which the piston has compressed the ignitable admixture to an extreme degree, however, the required voltage may also be approximately 30 kV in order to jump over this gap of one millimeter. An ignition coil can further be configured for all possible necessary ignition voltage requirements in a relatively simple manner. Even relatively high voltages of 40 kV or 60 kV are no problem if the corresponding insulation requirements in the ignition coil, on the way to the spark plug and at the spark plug up to the spark gap are configured accordingly.

The ignition voltage requirement for a spark to arc over is therefore dependent on the air gap and the environmental conditions, that is to say, the medium in the region of the spark gap, the pressure, temperature and air humidity. With an air gap of 1 mm and under normal atmospheric conditions, the spark arcs over when an ignition coil reaches a secondary voltage of 1 kV. If the gap is doubled, the voltage which is necessary to overcome the air gap is also doubled. In this case, 2 kV is required to jump over an air gap of 2 mm. If the environmental conditions are changed by, for example, the environmental pressure, the medium around the spark gap or the temperature increasing, then the voltage which is necessary to overcome the air gap also increases. A value of 1 kV for an air gap of 1 mm can then also quickly become a value of 20 kV or more. This is the case, for example, if the piston has compressed the air/fuel admixture in a cylinder. On the other hand, the spark seeks the easiest way to bridge a highly insulating element, such as air or gas. However, air or a compressed gas is still a good conductor with respect to insulating ceramic material. In the case of an air-surface gap sparking, the spark also seeks the easiest path which is not, however, provided by an arc-over in air but instead by creeping along a solid medium.

Precisely these two effects are used as follows for the present invention. If a very highly conductive element, which is, however, insulated from the overall system, is inserted into the spark gap, the spark gap is reduced by the length of the conductive element. Therefore, it does not matter whether 2×0.5 mm or 1×1 mm of spark gap is present. It also does not matter whether the conductive interruption of the spark gap is 1 mm or 1 m as long as it is highly conductive. The spark voltage requirement which the ignition coil has to reach remains the same. The ignition spark is further generated at both spark gaps at the same time. The important aspect is that the spacing of the ignition electrode from a foreign mass is substantially greater than the desired spark gap because otherwise the spark does not arc over at the desired arc gap. In the case of air-surface gap sparking, the earth electrode is provided as close as possible to the ignition electrode or, as in the present invention which is described below, as close as possible to the conductive element or slot in the lower region under the prechamber so that a creep of the spark is possible.

The same applies if an insulating blockage in the spark gap is used. If the ignition voltage which the ignition coil can provide is greater than the ignition voltage requirement in order to pass this blockage, the ignition spark will nevertheless jump across. If, however, the entire ignition spark gap contains an insulating envelope with a blockage, then no spark jumps across. In an insulating ceramic material, however, a barely visible hairline crack is already sufficient for a spark to be able to penetrate such an insulating ceramic material. The invention makes use of precisely this described physical circumstance in order to provide a special type of prechamber spark plug.

Ignition coils are described as follows and constructed as shown in the Figures, wherein only a very simplified description is given here in order to explain the fundamental principle. The spark plug 1 has a connection adapter 10 at the highest region thereof for the ignition coil or ignition lead. This adapter may be, for example, an SAE head or a configuration with a thread. The connection adapter 10 is connected to the central electrode 11 of the spark plug 1 in a conductive manner. An insulating ceramic material 12 surrounds this conductive high-voltage core. A metal unit 13, by means of which the spark plug 11 can be screwed into the cylinder head, is arranged under the insulating ceramic material 12. In this case, the spark plug thread 14 forms the mechanical, electrical and thermal connection with respect to the cylinder head. The connection adapter 10, the insulating ceramic material 12 located below and the screw fitting for the spark plug socket are received in the plug shaft.

The lower thread terminates flush with the cylinder in the normal case. The central electrode 11 projects into the combustion chamber under the spark plug thread 14. Under that, the earth electrode 15 is located with spacing over a defined air gap. The earth electrode 15 is electrically connected to the spark plug thread 14. The central electrode 11 and earth electrode 15 with the spark plug thread 14 are separated from each other by means of the insulating ceramic material 12. In this case, the air spark gap forms the narrowest location in the combustion chamber.

The insulating ceramic material 12, that is to say, the precise configuration of the connection between the central electrode 11 and the fixing mass, still has another important function. It ensures the correct thermal value of the central electrode of the spark plug. At the central electrode 11, specific temperatures must not be reached so that, for example, undesirable glow ignitions are not brought about. Therefore, the temperature which is introduced through the combustion chamber to the central electrode 11 must direct away the temperature developments at the central electrode or at the transmitting, conductive pin as efficiently as possible. This is ensured by the insulating ceramic material 12 being broader and being guided up to the screw mass only in a narrow manner.

The principle of prechamber spark plugs 1 will be described briefly below. Passive prechamber spark plugs differ from normal air-spark spark plugs only as a result of a cap 16 in the lower portion. The spark gap is therefore no longer directly in the combustion chamber, but is separated therefrom by this cap 16. A plurality of openings 17 are located in the cap 16. A spark gap is located, similarly to the one in a normal air-spark spark plug, in the prechamber which is formed by the cap 16.

If the compression cycle in the cylinder starts, then there is also a pressure equalization between the cylinder and the prechamber as a result of the provided openings 17 which act as holes or outlet nozzles. Therefore, some fuel/air admixture located in the cylinder flows into the prechamber. If the control unit now stops the current supply to the ignition coil, the high-voltage development is produced at the ignition coil secondary side and consequently also at the central electrode 11. In the prechamber, an arc-over now occurs similarly to the occurrence in a normal air spark ignition coil. This arc-over ignites the flammable admixture in the prechamber. In the prechamber, the same thing as normal occurs in the cylinder of a normal air spark ignition coil if compressed admixture is ignited, only at a far smaller scale. The gas expands but can, in contrast to a cylinder in which the piston is thereby moved downward, be discharged in the prechamber only through the openings 17. These openings 17 are generally arranged annularly around the prechamber so that the outwardly pressed prechamber flames simultaneously reach by their own pressure as much as possible of the compressed cylinder. With respect to a simple spark plug which ignites the compressed combustion chamber only at the air spark gap initially or initiates the ignition, the compressed combustion chamber can be ignited very rapidly and uniformly by means of the prechamber spark plug because the flame front which propagates is substantially reduced and the ignition time is consequently not delayed. An internal combustion engine can thereby be operated more efficiently.

As already mentioned in the introduction, the prechamber spark plug 1 has very many advantages if it is configured favorably, in particular as a result of the formation and/or number of the openings 17 and the shape of the prechamber 30 with the spark gap 20. Particularly the prechamber volume in relation to the number of openings 17 and the cross sections and shape thereof can be adapted very efficiently to a specific speed and load range. Precisely here, however, the previously known prechamber system has a disadvantage. Although a normal air-spark spark plug 1 does not ignite the combustion chamber as efficiently, it ignites it in all cases over the entire speed and load range. A prechamber spark plug 1 cannot until now structurally be configured over the entire speed and load range. Consequently, difficulties in ignition during cold-starts and/or at low speeds or with partial load may occur. This is the case if, as a result of the configuration, for example, for the point of maximum power, insufficient flammable admixture comes into the prechamber. In order to configure a prechamber spark plug 1 over the entire operating range, it may be the case that the enormous advantages at the full-load point would have to be drastically reduced.

In order to configure a prechamber spark plug 1 over the entire speed and load range, the principle described below is applied.

Two configurations are substantially possible. In a first configuration, a passive prechamber spark plug 1 can be provided with a double prechamber 30, 31 which has an intermediate wall (described below) with an insulator 40 and electrically conductive element 50, as schematically depicted in FIG. 1. In an alternative second configuration, there can be provided a single prechamber 30, the base of which directed toward the earth electrode 15 is formed in the manner of the intermediate wall of the prechamber spark plug 1 with a double prechamber 30, 31 and wherein the lower region under the upper prechamber 30 is directly connected to the combustion chamber. In both cases, an air spark gap is provided in the upper prechamber 30 and in the lower region, that is to say, under the prechamber 30, a surface discharge gap is provided, wherein the spark creeps along the insulator 40. For the surface discharge gap, the earth electrode 15 is arranged near the insulator 40. Possible constructive embodiments are described in detail below.

In principle, the upper structure of the prechamber spark plug 1 is the same in all the embodiments as in a normal passive prechamber spark plug 1, that is to say, when considered in simplified terms, the connection adapter 10, the central electrode 11, the insulating ceramic material 12 and the metal unit 13. In the lower structure, it differs from the structure of previously known prechamber spark plugs 1 in a number of areas, as described below with reference to different embodiments.

In a first embodiment, a passive prechamber spark plug 1 having a double prechamber 30, 31 is described. The double prechamber 30, 31 has an upper prechamber 30 and a lower prechamber 31. In the upper region of the upper prechamber 30, the central electrode 11 projects outwardly and the earth electrode 15 is arranged in the lower region of the lower prechamber 31.

In this double prechamber 30, 31, two serially arranged spark gaps 20, 21 are provided, that is to say, the first or upper spark gap 20 is provided in the upper prechamber 30 and the second, lower spark gap 21 is provided in the lower prechamber 31. As already described in the introduction, ignition sparks, which are generated by the same high voltage and at the same time and by which the simultaneous ignition of two separate prechambers 30, 31 is enabled, can be generated by the spark gaps 20, 21 arranged in series.

In this embodiment, a row of openings 17 which is associated with the upper prechamber 30 and at least one opening 18 which is associated with the lower prechamber 31 are also present, as schematically shown in FIG. 1.

As already described in the introduction, however, only one prechamber spark plug 1 is required for the upper speed and load range. No prechamber is required in the lower part-load region, that is to say, a normal spark plug 1 which functions in accordance with the principle of the air-surface gap sparking would be sufficient. In an alternative embodiment, therefore, a combined spark plug 1 is used and combines a prechamber spark plug 1 and an air-surface gap spark plug 1 as follows. Therefore, only one single prechamber is provided, that is to say, the upper prechamber 30 with the first or upper spark gap 20. The second spark gap 21 is provided as in an air-surface gap spark plug 1, that is to say, the earth electrode 15 is arranged with the smallest possible spacing from the base of the first prechamber 30 so that a creep of the spark over the insulator 40 to the earth electrode 15 is possible. Consequently, however, two spark paths 20, 21 are present, as FIGS. 2 to 5 show.

The separation of the two prechambers 30, 31 or the provision of the two spark gaps 20, 21 is carried out in this instance by an insulator 40 which is formed, for example, as an insulating ceramic material. The insulator 40 is formed in the embodiments with the double prechamber 30, 31 as a separating wall which at the same time forms the base of the upper prechamber 30 and the ceiling of the lower prechamber 31. In the embodiments with only the upper prechamber 30, it forms the base of the upper prechamber 30 which separates the upper prechamber 30 from the lower region below.

In all the embodiments, an electrically conductive element 50 which interrupts the spark but electrically transmits it is inserted in the center of the insulator 40, as already described above. The electrically conductive element 50 can be formed in different manners, as described below.

Figure 2:
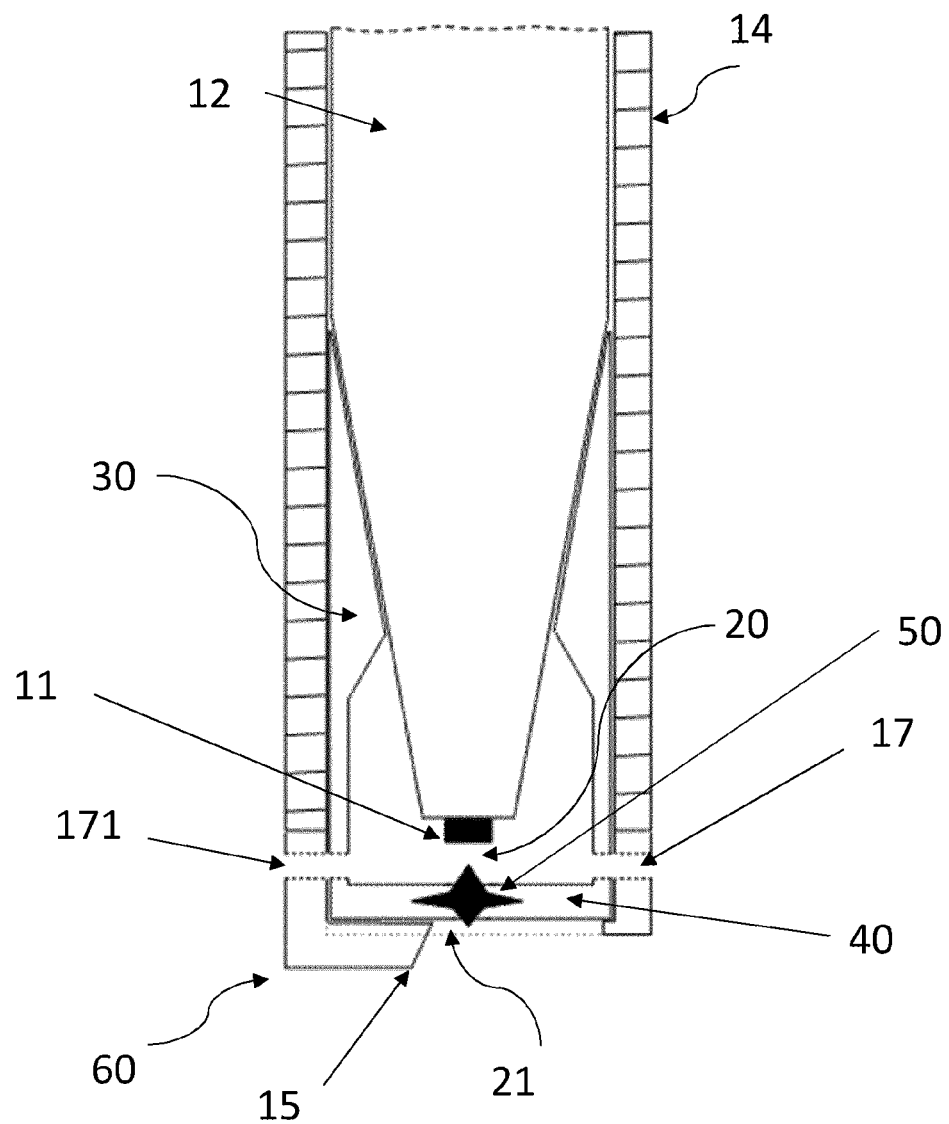
FIGS. 2 and 3 show a cross section of enlargements of the lower region of a prechamber spark plug according to different embodiments of the present invention.
Figure 3:
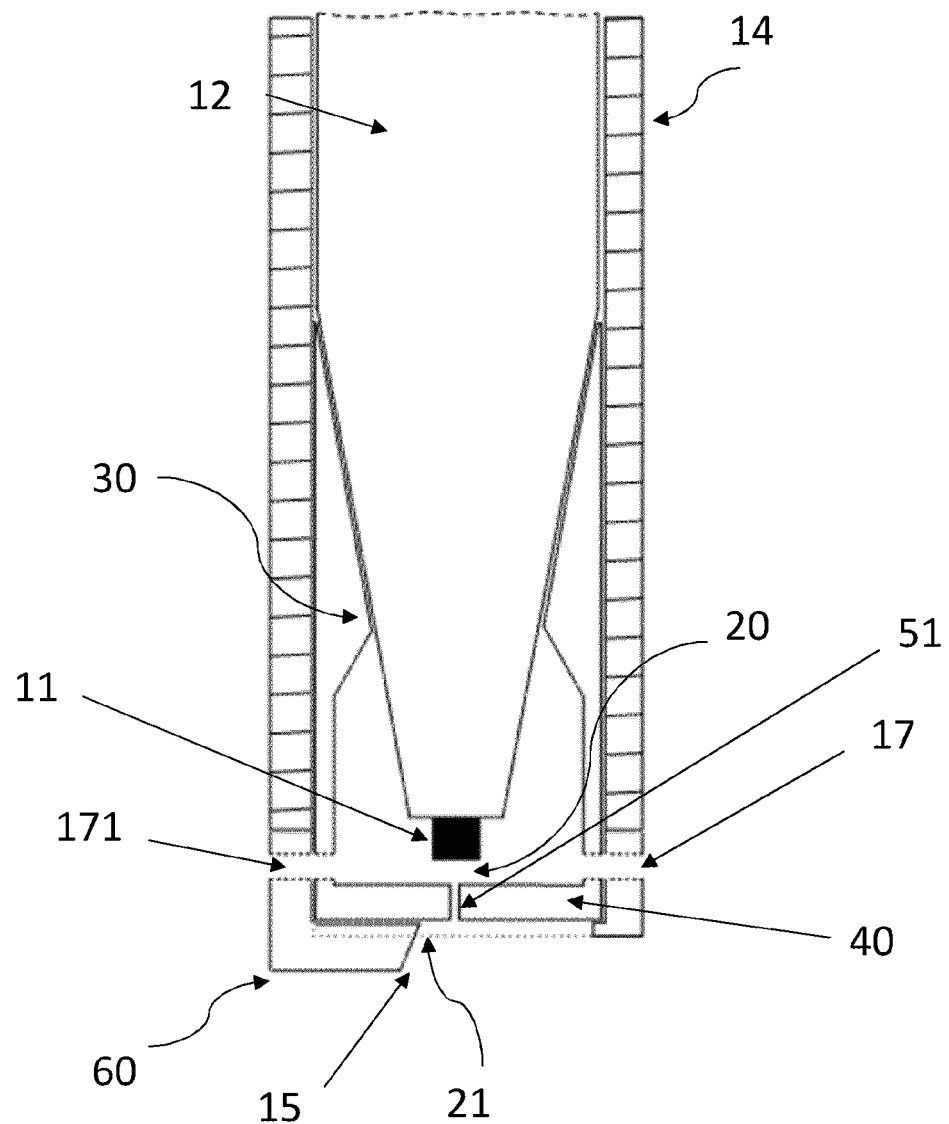
Figure 4:
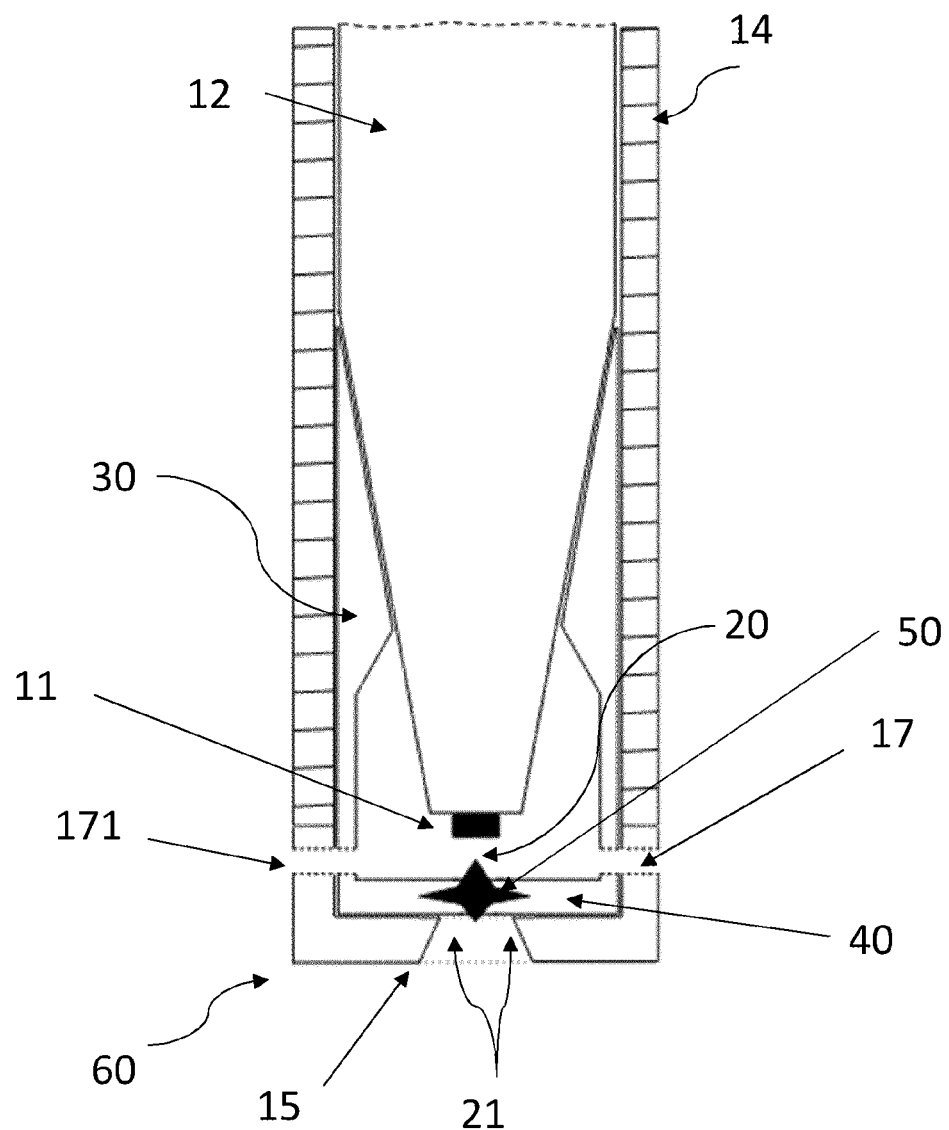
FIGS. 4 and 5 show a cross section of enlargements of the lower region of a prechamber spark plug according to alternative, different embodiments of the present invention.
Figure 5:
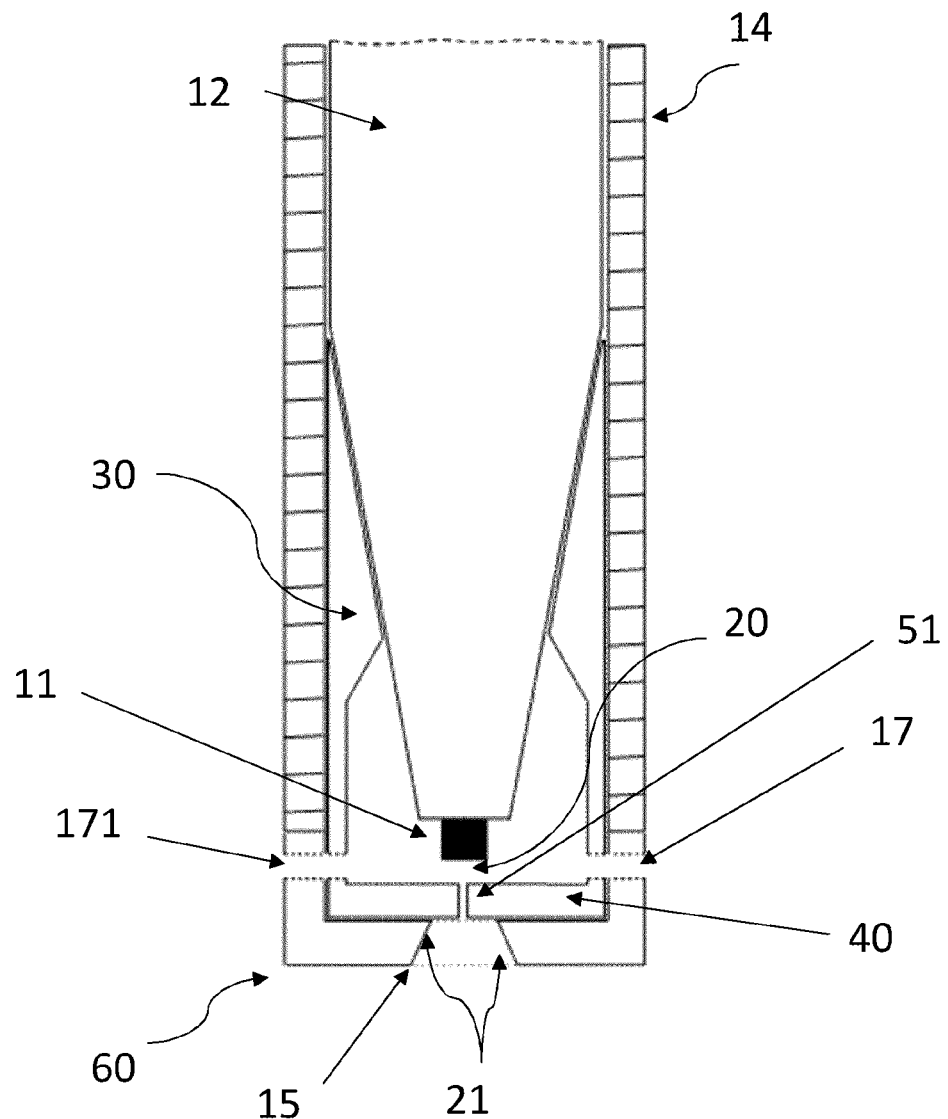

As shown in FIGS. 2 and 4 which show cross sections through a prechamber spark plug according to the invention, the electrically conductive element 50 can be formed as an insertion component. The shape of the insertion component is not decisive in this case. It must only allow an electrically conductive connection from the upper prechamber 30 into the region below, that is to say, the lower region located in the combustion chamber, or the lower prechamber 31 in order to provide the connection to the lower spark gap 21. The electrically conductive element 50 may also alternatively to the insertion component be formed only as a continuous slot 51 in the insulator 40, as shown in FIGS. 3 and 5. In this instance, it must be ensured that the slot 51 has the thickness of a hairline crack rather than the thickness of a drill hole. A hairline crack is a crack which is generally invisible to the naked human eye, usually of substantially less than 1 mm, generally instead 0.1 mm or less.

The second spark gap provided in the second prechamber 31 or in the lower region or in the combustion chamber is an air-surface gap spark gap, as shown in principle in FIGS. 1 to 5 as a schematic depiction. In this case, the earth electrode 15 is arranged with a very small spacing under the base of the upper prechamber 30, that is to say, the insulator 40, so that the lower spark gap 21 is in the form of an air-surface gap spark gap. In order to produce an air-surface gap sparking, the earth electrode 15 has to be arranged close enough to the insulator 40.

In the variant without any electrically conductive element 50, that is to say, in the variant with a slot 51, the gap through the slot 51 is also an air spark gap, even if at the location at which the spark arcs over in the slot 51 the spark contacts the insulator 40 to a minimal extent.

In the above-described embodiments, only one single spark plug unit is required with a single ignition coil. Each of the two spark gaps 20, 21 can consequently be configured for a specific speed load range. Consequently, the entire speed and load range can be efficiently covered without additional structural space or additional structural elements being required.

The fundamental structure of the lower region of the passive prechamber spark plug is substantially the same for all the embodiments. There is provided a prechamber sleeve which is provided as a metal outer sleeve and which has openings 17 and 18, screw thread 14 and the earth electrode 15. Depending on the embodiment, the earth electrode 15 is arranged in the lower prechamber 31. Alternatively, it is fixed to a carrier component 60 and arranged directly in the combustion chamber under the insulator 40. The lower base of the second prechamber 31 or the carrier component 60 are also part of the earth electrode. The partial region designated 15 of the actual earth electrode can be formed as a tip, as illustrated in the Figures, in order to provide a defined arc-over point. Furthermore, the tip can be made from particularly resistant material in order to reduce the wear. However, it is not necessary to provide a tip. If only a single earth electrode 15 is present, it can be arranged directly under the electrically conductive element 50.

Alternatively, the earth electrode 15 can also be in the form of a ring which simultaneously acts as a support for the insulator 40 and which consequently stabilizes it, as shown in FIGS. 4 and 5 for the embodiment with an electrically conductive element 50 and for the embodiment with a slot 51. However, there may also be provision for a plurality of earth electrodes 15 to be provided. They can be formed by the ring being formed as an interrupted ring so that the individual earth electrodes 15 are spaced apart from each other and thereby separated from each other.

An insulating ceramic material unit which is made from the insulating ceramic material 12 and a ceramic insertion sleeve is now inserted into this metal outer sleeve in a flush manner. This ceramic insertion sleeve has both outlet holes 171 which correspond to the openings 17 for the plasma discharge and an insulator 40 which is formed as an insulating ceramic separating wall for separating the upper prechamber 30 from the lower prechamber 31 or from the lower open region. Centrally in the insulating ceramic separating wall 40, a conductive element 50 or a slot 51 is formed. The insulating ceramic material 12 and the ceramic insertion sleeve do not necessarily have to be formed in a separated manner. The entire construction could also be in the form of a single ceramic component.

The openings 17, 18 and the outlet holes 171 can also be implemented during production only afterwards by a drilling operation through the metal outer sleeve and ceramic inner sleeve.

The separation of the first prechamber with respect to the region below can, as described, be carried out by a slot 51 in the insulator 40 or by a metal insertion component which is continuous in the insulator from the upper prechamber to the lower region.

In the variant in which a slot 51 is provided, the ceramic material has, between the two electrodes (ignition electrode and earth electrode), that is to say, in the same line of section, a very small slot 51 which allows the spark to arc through. This slot 51 requires only fractions of a millimeter and is, for example, formed with the thickness of a hairline crack. The slot 51 is negligibly small in relation to the outlet nozzles or openings 17. The important aspect is that the distance between the electrodes 11 and 15 remains as small as possible, that is to say, the distance between the central electrode 11 and the conductive element 50 or the slot 51 and the conductive element 50 or slot 51 and the earth electrode 15. A reason for this prerequisite is the necessary ignition voltage requirement which the ignition coil must supply and which becomes increasingly large with a greater spacing, particularly with a slot 51, that is to say, a through-opening without any insertion component, which can also be referred to as an air slot. Furthermore, the spark gap in the upper prechamber 30 must always be substantially smaller in relation to the distance between the central electrode 11 and the external mass. Otherwise, the spark would not spring from the central electrode 11 to the conductive element 50 or slot 51, but instead would take the easier way to the external electrode. In the lower region, the earth electrode 15 should be arranged as close as possible to the insulator 40 so that the spark creeps over the insulator 40.

The variants with the conductive element 50 have the advantage that they require less ignition voltage requirement because the spark gap is subdivided into two gaps and the conductive element 50 does not produce any voltage drop. In the variant with the slot 51, the advantage is that no additional metal element which becomes heated and which where applicable can lead to glow ignitions has to be provided.

The ceramic material, that is to say, the insulator 40, should be configured in such a manner that it separates two ignition regions (insulating with respect to the external mass), withstands the mechanical loads and discharges as much temperature as possible to the housing.

The provided prechamber spark plug provides two separate regions, in which an ignition of the flammable admixture at different operating points can be ensured. In this case, only one ignition coil and one spark plug are required. Consequently, in addition to the use in a great operating range, a very space-saving spark plug is provided.

LIST OF REFERENCE CHARACTERS

1 Spark plug (prechamber spark plug/air-spark spark plug)
10 Connection adapter
11 Central electrode
12 Insulating ceramic material
13 Metal unit
14 Spark plug thread
15 Earth electrode
16 Cap
17 Upper row of openings
18 Lower row of openings
171 Outlet openings of insulating ceramic sleeve
20, 21 Upper or lower spark gap
30, 31 Upper or lower prechamber
40 Insulator
50 Electrically conductive element
51 Slot
60 Carrier component

The invention claimed is:

1. A passive prechamber spark plug for use in a combustion chamber of a vehicle engine, comprising:
   an upper prechamber having a plurality of upper openings arranged annularly around the upper prechamber and disposed in a prechamber sleeve which is a metal outer sleeve, wherein the upper prechamber is connectable to the combustion chamber via the plurality of upper openings;
   an upper air spark gap, wherein an air ignition spark is formable via the upper air spark gap;
   a central electrode disposed in an upper region of the upper prechamber;
   a lower region under the upper prechamber, wherein the lower region is either a lower prechamber or is arrangeable directly in the combustion chamber;
   an insulator, wherein the insulator is a separating wall disposed between the upper prechamber and the lower region and wherein the insulator is a base of the upper prechamber;
   an electrically conductive element or a slot, wherein the electrically conductive element or the slot is disposed in the insulator; and
   an earth electrode disposed in the lower region such that a lower air-surface gap spark gap is formed between the earth electrode and the electrically conductive element or the slot, wherein an air-surface gap ignition spark is formable via the lower air-surface gap spark gap.

2. The passive prechamber spark plug according to claim 1, wherein:
   the lower region is the lower prechamber;
   the lower prechamber has a plurality of lower openings arranged annularly around the lower prechamber and disposed in the prechamber sleeve which is the metal outer sleeve, wherein the lower prechamber is connectable to the combustion chamber via the plurality of lower openings;
   the insulator is a ceiling of the lower prechamber; and
   the electrically conductive element or the slot, and the earth electrode, are disposed such that the upper air spark gap and the lower air-surface gap spark gap are disposed in series relative to each other.

3. The passive prechamber spark plug according to claim 1, wherein:
   the lower region is arrangeable directly in the combustion chamber; and
   the electrically conductive element or the slot, and the earth electrode, are disposed such that the upper air spark gap and the lower air-surface gap spark gap are disposed in series relative to each other.

4. The passive prechamber spark plug according to claim 1, wherein the electrically conductive element is a metal insertion component.

5. The passive prechamber spark plug according to claim 3, wherein a width of the slot is substantially smaller than a spacing between the earth electrode and the upper opening.

6. The passive prechamber spark plug according to claim 5, wherein the width of the slot corresponds to a hairline crack.

7. The passive prechamber spark plug according to claim 1, wherein the insulator is an insulating ceramic material.

8. A vehicle engine, comprising:
   the passive prechamber spark plug according to claim 1.

* * * * *